UNITED STATES PATENT OFFICE.

JONAS EBERHARDT, OF PHILADELPHIA, PENNSYLVANIA.

IMPROVEMENT IN PRODUCING COLORING-MATTER FOR DYERS.

Specification forming part of Letters Patent No. 46,888, dated March 21, 1865.

*To all whom it may concern:*

Be it known that I, JONAS EBERHARDT, of the city of Philadelphia, in the State of Pennsylvania, have invented a new and useful Coloring-Matter for Dyers; and I do hereby declare that the following is a full and exact description of the same.

The nature of my invention consists in the production of a new article of manufacture for the use of dyers as a base for dyeing various colors on cotton, silk, or woolen fabrics, and which, for commercial designation, I name "phenico."

To enable others skilled in the art or science to which it appertains to understand and make the said article, I will proceed to describe the process which I prefer for its production.

I take, say, twenty pounds of phenic acid, either in crystals or liquid, and gradually add to it about the same quantity of either concentrated nitric, sulphonitric, or azotosulphuric acid, or nitrous, sulphonitrous, or any other acid the action or reaction of which will produce an effect similar to that hereinafter described as producible by either of the said acids upon the phenic acid. I sometimes combine two or more of these acids and add the combination to an equal weight of the phenic acid. In either case I bring the temperature of the acids to about 60° Fahrenheit before mixing them. A moderate increase of temperature, however, will favor the reaction, which will immediately take place between the phenic acid and the acid or acids added to it, and the reaction will continue violently until the whole of the phenic acid has been decomposed. When the action or reaction has ceased I pour the acid liquor into a large quantity of water, when a precipitation of matter instantly takes place. I now remove the precipitate and wash it in water until it is clear of free acid, and then dry it. This dried substance is the new article which I call "phenico." The color of the dried precipitate will be either yellow, brown, or their intermediate shades, in accordance with the kind and quality or strength of the acid or acids used in decomposing the phenic acid. If strong nitric acid be used alone in decomposing the phenic acid, the precipitate will be of a bright, strong yellow. If nitrous acid alone be used, the yellow will be lighter or weaker in color. If sulphonitric or azotosulphuric acid be used the precipitate will be of a yellowish brown color, and if sulphonitrous acid be used the precipitate will be of a brown color. If the added acids be a mixture of two or more of them, the precipitate will be varied in its shade accordingly.

The article phenico thus produced, whether it be yellow, brown, or their intermediate shades of color, is intended to be sold in the market to dyers as a new base for producing colors on either cotton, silk, or woolen fabrics, varied in accordance with the manner in which the dyeing-bath may have been prepared for acting on the said base previously dissolved in alcohol, ammonia, acetic acid, or other solvents.

The phenico dissolved may be used alone to produce yellows and browns of its own shade, and the colors will be perfectly fast on the fabric without using a mordant.

As the preparation of the baths has not any relation to the production of the new article—phenico—a description of the former is not here necessary; but, Having fully described the process or mode by which I produce the said article, what I claim as my invention or production, and desire to secure by Letters Patent, is—

The phenico described, as a new article of manufacture, for the use of dyers.

JONAS EBERHARDT.

Witnesses:
BENJ. MORISON,
B. F. SHATTUCK.